United States Patent Office 3,125,547
Patented Mar. 17, 1964

3,125,547
EXTRUDABLE COMPOSITION CONSISTING OF A POLYOLEFIN AND A FLUOROCARBON POLYMER
Philip Strubing Blatz, Wilmington, Del., assignor to E. I. du Pont de Nemours and Company, Wilmington, Del., a corporation of Delaware
No Drawing. Filed Feb. 9, 1961, Ser. No. 88,004
10 Claims. (Cl. 260—45.5)

The present invention relates to hydrocarbon polymers of improved processability and, in particular, to hydrocarbon polymers having improved extrusion characteristics.

The melt extrusion of high molecular weight hydrocarbon polymers into film, tubing or pipe is accomplished, in general, by feeding solid polymer to an extruder in which the polymer is heated to a temperature above its melting point. A rotating screw pushes the polymer and the resulting viscous polymer melt through the extruder barrel into a die in which the polymer is shaped to the desired form. The resulting extrudate is then either quenched or allowed to cool slowly to temperatures below the melting point, causing the extrudate to rigidify and assume the shape of the die orifice. As will be readily understood, it is desirable to extrude at as high a speed as possible for economic reasons. Although the extrusion rate is readily increased by increasing the number of revolutions of the extrusion screw, which results in a higher polymer throughput, such increase is limited by the viscoelastic behavior of the polymer. At rates above this limit, an extrudate with a rough surface is obtained. This phenomenon has been explained in part by poor lubrication at the die orifice which is believed to cause the so-called "slip-stick" phenomenon. In particular, a herring bone pattern is noticed on the surface of the extrudate. One method of overcoming this deficiency is to raise the temperature of the melt at the die. The increased heat required adds to the fabrication cost. More serious, however, is the fact that hydrocarbon polymers are extruded at temperatures which are close to their decomposition temperatures and also close to the upper limit of temperatures available in commercial extruders. Consequently, it is highly desirable to be able to find means of increasing the speed of extrusion without raising the melt temperature which nevertheless result, at high speeds, in extrudates of smooth surfaces.

It is, therefore, the object of the present invention to provide improved hydrocarbon resins. It is another object of the present invention to provide hydrocarbon resins with improved extrusion characteristics. It is still another object of the present invention to provide hydrocarbon polymers resulting in extrudates of smooth surfaces when extruded at high extrusion speeds. Other objects will become apparent hereinafter.

In accordance with the present invention, it was discovered that melt extrudable hydrocarbon polymers containing from 0.01 to 2% of a fluorocarbon, wherein the fluorocarbon has a melt flow behavior similar to that of said polymer, have greatly improved extrusion charactristics and can be extruded at substantially higher rates into extrudates which have smooth surfaces without raising the temperature at the extrusion die.

The fluorocarbons employed in the formation of the modified melt extrudable hydrocarbon polymers of the present invention are fluorocarbon polymers having melt flow characteristics similar to that of hydrocarbon polymers. By that is meant fluorocarbon polymers which are solid when the hydrocarbon polymer is solid and are fluid when the hydrocarbon polymer is in the form of a melt. More specifically, the fluorocarbons added should be solid in the use temperature range of the hydrocarbon polymer and fluid in the extrusion temperature range of the polymer. Thus, they should have a melting point, in the case of a crystalline polymer, or a softening point in the case of amorphous polymer, which is below the extrusion temperature employed in the extrusion of the hydrocarbon polymer, modified by the addition of the fluorocarbon polymer. If the polymer is a solid at the extrusion temperature, little or no improvement in the extrusion characteristics of the hydrocarbon polymer is obtained. On the other hand, if the molecular weight is too low, the fluorinated polymer is not believed to have the lubricating properties on which the improvement, found with the modified hydrocarbon polymers of the present invention, is base. Hence, the molecular weight should be sufficiently high so that the fluorocarbon polymer added does not melt or become liquid at temperatures substantially below the melting point of the hydrocarbon polymer. Furthermore, the molecular weight of the fluorocarbon polymer should be high enough to prevent exudation from the extrudate at use temperatures. Hence, the melting or softening point of the added fluorocarbon polymer should be in the range of 120 to 300° C., and, preferably in the range of 150 to 250° C. With respect to their chemical composition, it is preferred to employ fluorocarbon polymers having an atomic fluorine to carbon ratio of at least 1:2. They are in particular polymers, homopolymers, as well as copolymers, of fluorinated olefins having an atomic fluorine to carbon ratio of at least 1:2. Monomers which give rise to suitable polymers include vinylidene fluoride, vinyl fluoride chlorotrifluoroethylene, tetrafluoroethylene, hexafluoropropylene, etc. Copolymers of these olefins with influorinated olefins are also suitable additives if they have the above stated fluorine to carbon ratio. Specific examples of the fluorocarbon polymers employed in the present invention are telomers of tetrafluoroethylene, telomers of chlorotrifluoroethylene and, in particular, fluorocarbon rubbers, such as copolymers of hexafluoropropylene and vinylidene fluoride. These specifically described polymers are prepared by methods known in the art and are commercially available.

The effect of the addition of these fluorocarbon polymers is extremely sensitive. Even when added in quantities as low as 500 parts per million, all surface roughness is eliminated. Quantities in excess of 2% are not necessary, since the hydrocarbon polymers are, in general, not compatible with the fluorinated polymers at higher levels. Therefore, the addition of higher concentrations serves no particular useful function and, as a matter of fact, when the incompatible fraction of the added fluorocarbon polymer becomes too large, it may adversely affect the optical properties of the extrudate in that it causes a haze which should be avoided.

The hydrocarbon polymers to which the fluorocarbon polymers are added comprise, in general, all thermoplastic hydrocarbon polymers obtained by the polymerization of monoolefins having the general structure $CH_2=CHR$, where R is a hydrogen or an alkyl radical. In general, the alkyl radical contains not more than 8 carbon atoms. In particular, the invention is applicable to polyethylene, both the high density type and the low density type, polypropylene, polybutene-1, poly(3-methylbutene), poly(4-methylpentene), and copolymers of ethylene with $\alpha$-olefins, propylene, butene-1, octene-1, decene-1, octadecene-1, etc. The term "hydrocarbon polymer" is also intended to include modified polyolefins which contain small concentrations of up to 10 mol percent of polar monomers such an vinyl acetate, ethyl acrylate, etc. Similarly, the invention is also applicable to blends of hydrocarbon polymers, and hydrocarbon polymers containing additives such as antioxidants, light stabilizers, pigments, etc. In view of the different melt characteristics of the hydrocarbon polymers mentioned, the addition of the fluorocarbon polymers may be of greater value in some hydrocarbon polymers than in others. Thus, some hydrocarbon polymers, such as polypropylene and branched polyethylene, have better melt flow characteristics at lower temperatures so that surface roughness and other surface defects can be avoided by adjustment of extrusion conditions and these hydrocarbon polymers do not necessarily require the use of the fluorocarbon polymer additives of the present invention, although the described improvement is also obtained with such polymers at low extrusion temperatures. However, other polymers, such as high density polyethylene, and, particularly, those high density polyethylenes with narrow molecular weight distributions, do not have this degree of freedom in the variation of extrusion conditions and it is particularly with these resins that spectacular improvements in the surface quality of the extruded product are obtained by the addition of the fluorocarbon polymers described.

The addition of the fluorocarbon polymer can be accomplished by any of the means heretofore developed for the addition of modifiers to polyethylene. Thus, the fluorocarbon polymer is added to the hydrocarbon polymer in a rubber compounding mill, in a Banbury mixer or a mixing extruder in which the fluorocarbon polymer is uniformly distributed throughout the hydrocarbon polymer. The mixing operation is carried out at a temperature above the melting point of the polymer. It is also feasible to blend the two polymers in the solid state and then cause the uniform distribution of the fluorocarbon resin in the melt extruder employed in the fabrication, by providing a mixing section with a suitable mixing torpedo in the extruder.

The invention is further illustrated by the following examples.

EXAMPLE I

To 2 lbs. of an ethylene butene-1 copolymer containing 5 weight percent of butene, having a density of 0.935 g./cc. (ASTM D–792–50), and a melt index of 1.4 g./10 min. (ASTM D–1238–57T) heated to 180° C. on a rubber mill was slowly added 90 g. of a hexafluoropropylene-vinylidene fluoride copolymer commercially available as "Viton" A. The compounding was continued until a uniform blend was obtained. The molten mixture was then sheeted off, cut up and dry blended with 18 lbs. of the copolymer. The copolymer was then fed into a 2 in. extruder where the polymer was heated to a temperature of 180° C., passed through a mixing torpedo and into a conventional blown film die with a circular die orifice having a 4 in. diameter and an annulus .020 in. wide. The die was maintained at 180° C. The film, having a thickness of 1.25 mils, was extruded at a rate of 50 ft./min. using a blow up ratio of 1.5:1.

The resulting film is compared to film obtained with the same resin but without the addition of the fluorocarbon resin at the same extrusion conditions.

*Table I*

| Resin | Percent Transparency [1] | Film Appearance |
|---|---|---|
| Ethylene/butene copolymer | 2.3 | Herring bone pattern. |
| Ethylene/butene copolymer containing 1% of the fluorocarbon resin. | 39.2 | No herring bone pattern. |

[1] ASTM D–1746–60T.

EXAMPLE II

To 100 lbs. of the copolymer employed in Example I was added 0.5 lb. of the concentrate blend prepared in accordance with the procedure of Example I. The resulting mixture was dry blended and extruded into film using the conditions of Example I. Film obtained under identical conditions from unmodified copolymer is compared to film made with the "Viton" A, hexafluoropropylene-vinylidene fluoride modified copolymer in Table II.

*Table II*

| Resin | Percent Transparency [1] | Film Appearance |
|---|---|---|
| Ethylene/Butene Copolymer | 5.7 | Herring bone pattern. |
| Ethylene/Butene Copolymer containing 500 ppm of Fluorocarbon Polymer. | 69.0 | No herring bone pattern—clear film. |

[1] ASTM D–1746–60T.

EXAMPLE III

To 2 lbs. of the ethylene-butene copolymers described in the foregoing examples was added 4 g. of a telomerized polytetrafluoroethylene obtained by the polymerization of tetrafluoroethylene in methanol having a melting point of 125° C. and a fluorine to carbon ratio of about 2:1. The resulting polymer was then dry blended with 13 lbs. of the copolymer and extruded into film using the procedure set forth in Example I. Film obtained under identical conditions from the unmodified copolymer is compared to film made with the polytetrafluoroethylene alcohol modified copolymer in Table III.

*Table III*

| Resin | Percent Transparency [1] | Film Appearance |
|---|---|---|
| Ethylene/Butene Copolymer | 5.0 | Herring bone pattern. |
| Ethylene/Butene copolymer containing 600 ppm of fluorocarbon resin. | 35.0 | No herring bone pattern. |

[1] ASTM D–1746–60T.

EXAMPLE IV

High density polyethylene, having a density of 0.956 g./cc. and a melt index of 0.8 to 1.0 g./10 min., was blended with 1% of a hexafluoropropylene/vinylidene fluoride copolymer commercially available as "Viton" A, using rubber mills at a temperature of 180° C. The resulting blend was then melt extruded using a 2 in. extruder and a barrel temperature of 170° C. The molten polymer was formed into tubing using a ⅝" tubing die with a 9/16" mandrel. The die was maintained at a temperature of 156 to 170° C. A tubing having a smooth, clear, glossy inner and outer surface was obtained. In the absence of the fluorocarbon polymer the tubing was rough and did not have a glossy surface.

A similar result is obtained with polypropylene in the foregoing procedure when extruded at a speed at which surface roughness is obtained in the extrudate. On addition of the fluorocarbon resin the surface defects are eliminated.

EXAMPLE V

A blend of 21.25 lbs. of high density polyethylene having a density of 0.958 g./cc. and a melt index of 0.8 to 1.0 g./10 min. and 3.75 lbs. of a vinyl acetate modified polyethylene containing 6.3 weight percent of vinyl acetate was blended with 1% of "Viton" A, commercially available copolymer of vinylidene fluoride and hexafluoropropylene. The resulting blend was extruded through a 2" extruder at temperatures of approximately 170° C. into tubing using a ⅝" tubing die with a 9/16" mandrel. A tubing having a smooth, clear, glossy inner and outer surface was obtained. In the absence of the fluorocarbon polymer, the tubing was rough and did not have a glossy surface.

I claim:

1. A melt extrudable thermoplastic polymer of an olefin, having the formula RCH=CH$_2$, where R is a radical selected from the group consisting of hydrogen and alkyl radicals having from 1 to 8 carbon atoms, containing from 0.005 to 2 weight percent of a fluorocarbon polymer having a fluorine to carbon ratio of at least 1:2 and being fluid at a temperature between 120° C. and 300° C.

2. A melt extrudable thermoplastic polymer of an olefin, having the formula $RCH=CH_2$, where R is a radical selected from the group consisting of hydrogen and alkyl radicals having from 1 to 8 carbon atoms, containing from 0.005 to 2 weight percent of a polymer of a fluorinated olefin, said olefin having a fluorine to carbon ratio of at least 1:1 and having a melting point or softening point in the range of 120 to 300° C.

3. The composition of claim 2 wherein the polymer of a fluorinated olefin is a tetrafluoroethylene polymer.

4. The composition of claim 2 wherein the polymer of a fluorinated olefin is a copolymer of vinylidene fluoride and hexafluoropropylene.

5. The composition of claim 2 wherein the thermoplastic polymer is polyethylene.

6. The composition of claim 2 wherein the thermoplastic polymer is a copolymer of ethylene and an α-olefin.

7. The composition of claim 6 wherein the copolymer is a copolymer of ethylene and butene.

8. The product of claim 1 in film form.

9. The product of claim 1 in tubular form.

10. A melt extrudable thermoplastic polymer selected from the class consisting of polyethylene and ethylene α-olefin copolymers wherein the α-olefin has the structure $RCH=CH_2$, where R is an alkyl radical having from 1 to 8 carbon atoms, containing from 0.005 to 2 weight percent of a fluorocarbon fluid at temperatures between 120° to 300° C., selected from the class consisting of copolymers of vinylidene fluoride and hexafluoropropylene and telomerized polytetrafluoroethylene.

References Cited in the file of this patent

UNITED STATES PATENTS

| | | |
|---|---|---|
| 2,400,091 | Alfthan | May 14, 1946 |
| 2,681,324 | Hochberg | June 15, 1954 |
| 2,718,452 | Lontz | Sept. 20, 1955 |
| 2,719,833 | Vincent et al. | Oct. 4, 1955 |
| 2,752,321 | Heller | June 26, 1956 |
| 2,906,123 | Vernet et al. | Sept. 29, 1959 |
| 2,944,927 | Dosman | July 12, 1960 |
| 2,945,827 | Henning | July 19, 1960 |
| 3,069,401 | Gallagher | Dec. 18, 1962 |

FOREIGN PATENTS

| | | |
|---|---|---|
| 1,214,372 | France | Apr. 8, 1960 |

UNITED STATES PATENT OFFICE
CERTIFICATE OF CORRECTION

Patent No. 3,125,547                                            March 17, 1964

Philip Strubing Blatz

It is hereby certified that error appears in the above numbered patent requiring correction and that the said Letters Patent should read as corrected below.

Column 1, lines 60 and 61, for "charactristics" read -- characteristics --; column 2, line 15, for "base" read -- based --; line 33, for "influorinated" read -- unfluorinated --; line 68, for "such an" read -- such as --.

Signed and sealed this 14th day of July 1964.

(SEAL)

Attest:

ESTON G. JOHNSON  
Attesting Officer

EDWARD J. BRENNER  
Commissioner of Patents